(No Model.)
2 Sheets—Sheet 1.

J. H. SEWALL.
BRAKE SLACK ADJUSTER.

No. 535,774. Patented Mar. 12, 1895.

Witnesses
A. L. Hobby
A. F. Barthel

Inventor
James H. Sewall
By Thos. S. Sprague & Son
Attys.

(No Model.)
2 Sheets—Sheet 2.

J. H. SEWALL.
BRAKE SLACK ADJUSTER.

No. 535,774. Patented Mar. 12, 1895.

Witnesses
A. L. Hobby
A. F. Barthel

Inventor
James H. Sewall
By Thos. S. Sprague & Son
Attys.

UNITED STATES PATENT OFFICE.

JAMES H. SEWALL, OF PORTLAND, ASSIGNOR OF ONE-HALF TO FRANK ROBINSON, OF BANGOR, MAINE.

BRAKE-SLACK ADJUSTER.

SPECIFICATION forming part of Letters Patent No. 535,774, dated March 12, 1895.

Application filed December 18, 1894. Serial No. 532,175. (No model.)

*To all whom it may concern:*

Be it known that I, JAMES H. SEWALL, a citizen of the United States, residing at Portland, in the county of Cumberland and State of Maine, have invented certain new and useful Improvements in Brake-Slack Adjusters, of which the following is a specification, reference being had therein to the accompanying drawings.

The invention consists in the peculiar construction of a slack "take-up" connecting bar for car brakes, and consists particularly in the construction, arrangement and combination of the various parts of a two-part bar of this kind whereby it is simplified and cheapened in manufacture, made more positive in its operation and more nearly dust proof than such devices have heretofore been, all as more fully hereinafter described.

Figure 1:
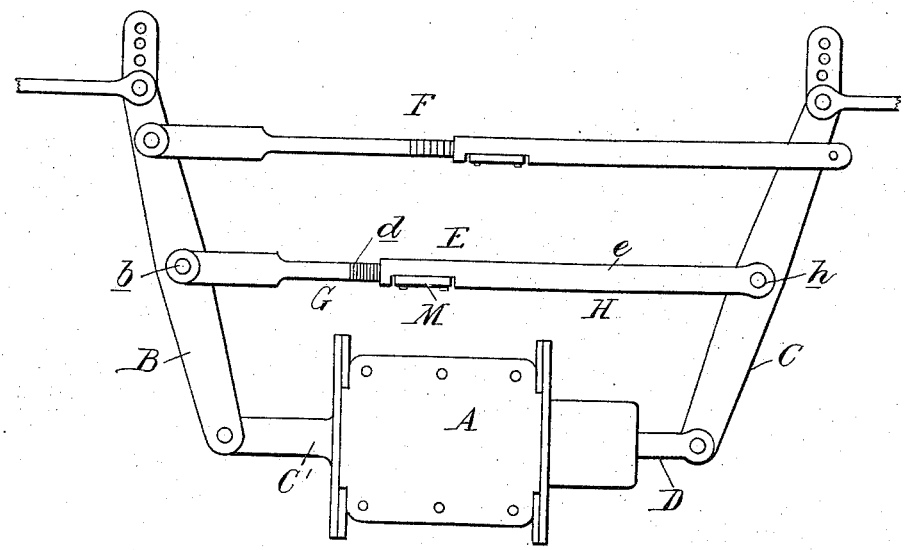
Figure 2:
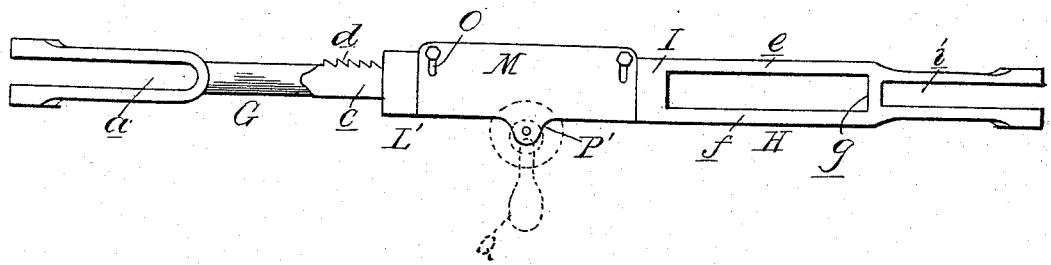
Figure 3:
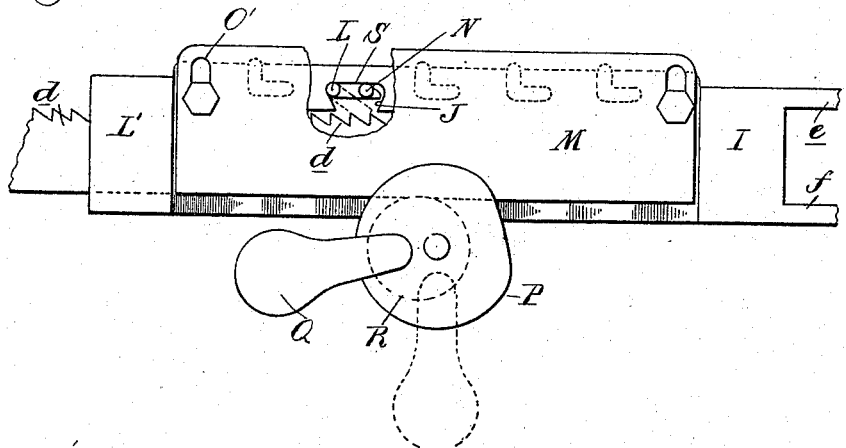
Figure 4:
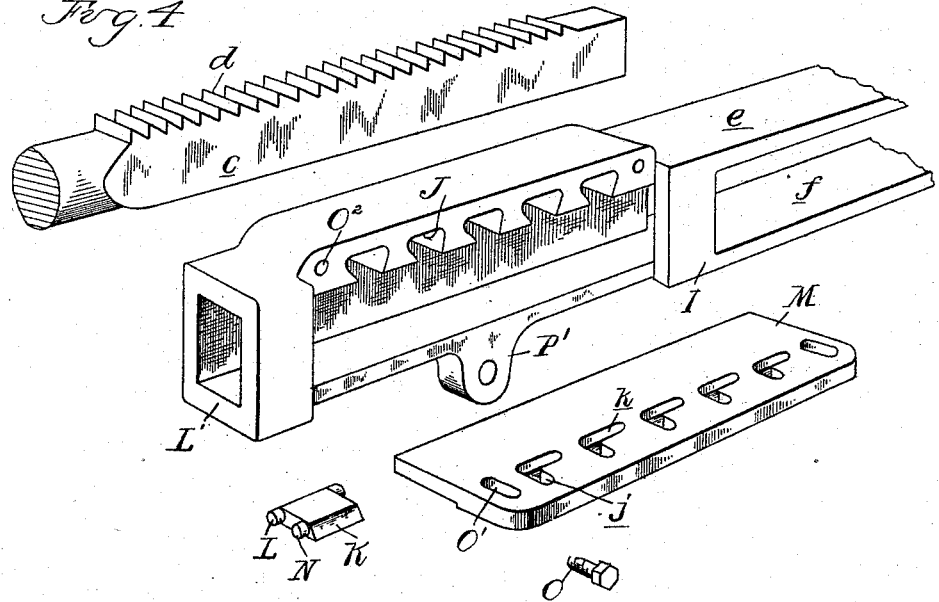

In the drawings, Figure 1 is a plan view of my improved device, showing it applied to the cylinder levers of an air brake apparatus. Fig. 2 is a side elevation of one of the take-up bars shown in Fig. 1. Fig. 3 is a similar side elevation of the central portion thereof, partly in section and showing the parts in a different position. Fig. 4 is a perspective view of the meeting ends of the two sections of the bar with the movable parts detached.

A is an air brake cylinder.

B and C are the two cylinder levers. The lever B is pivoted to the stationary arm or bracket C' and the lever C is pivoted to the end of the piston rod D. Near the middle these levers are connected by the fulcrum rod or bar E and near their ends with the take-up bar F. At the outer ends, these levers are connected to the usual brake apparatus on the car trucks. These parts thus combined and arranged are set forth and described in a concurrently pending application of Frank Robinson, Serial No. 531,233, filed December 8, 1894, and I lay no claim thereto, except as hereinafter specified.

The bars E and F are similar except in minor parts hereinafter set forth, and as the take-up connection in each is the same I will describe the bar F, which will suffice for a description of both. This bar consists of two sections G and H. The section G at one end has the bifurcation *a*, embracing the lever B, and through which the pivot pin *b* passes, as plainly shown in Fig. 1. At its opposite end it is provided with the squared body *c*, upon the upper face of which is the notched portion or bar *d*, preferably a ratchet bar. The section H comprises an upper plate *e* and lower plate *f*. These two plates are connected near the ends by the connecting bar or web *g h*. Is a pin which passes through apertures in the end of the plates *e, f*, as shown, in Fig. 1, to form between the pin *h* and the web *g* a longitudinal slot or aperture *i*, through which engages the lever C, and in which said lever may have a limited sliding movement. The upper and lower plates *e* and *f* form two sides of a sleeve. At the other end of the section H, I form an open-ended sleeve I, in which the end *c* of the section G is adapted to slidingly engage and to snugly fit so as to have the least possible angular motion therein. In the under face of the top of such sleeve I form a series of recesses or sockets J, in which engage the dogs or pawls K having at their upper ends the pins L. These pins enter sockets in the fixed side L' of the sleeve and at the other end engage in the vertical section *j* of L-shaped recesses formed on the inner face of the detachable plate M forming the other side of the sleeve.

N are pins at the lower end of the dogs K at one side engaging in the horizontal portion *k* of the recesses or slots in the inner face of the plate M. This plate is supported upon the end of the section H by means of the screws O, passing through vertical slots O' in the plate and entering suitable screw threaded apertures $O^2$ in the top wall of the sleeve.

P is a cam journaled in a bracket or lug P' on the under side of the sleeve and adapted to engage the under face of the plate M.

Q is a handle therefor acting to hold the cam normally in the position shown in Fig. 2, in which position the plate will be in its lowest position.

R is a flange on the cam P extending over the lower portion of the plate M and acting to hold it snugly against the side of the sleeve, thereby dispensing with the necessity of other securing means for the lower portion of that plate. It will be evident that in the position of the parts shown in Fig. 2, the plate will act as a coupling bar for all the dogs or pawls compelling them to rise and fall simultaneously and uniformly by virtue of the pins N engaging in the recesses $k$ of the plate and thereby preventing the catching or sticking of any one or more of them in operation, and if it is desired to separate the sections of the take-up bar, the pawls may be all disengaged from the notched bar by turning the cam into the position shown in Fig. 3, which will raise the dogs into the sockets J, as shown at S in that figure, permitting the removal or adjustment of the parts. It will be seen that all the movable parts are entirely inclosed within the sleeve and hence are free from clogging with dust or snow, which gives the advantage previously set forth that the sleeve forms a closed guide for the end of the ratchet bar to prevent any angular motion between the sections and that all of the parts are simple, easily manufactured, easily understood and adjusted.

The coupling of the pawls together, prevents stripping of the teeth under undue strain, as might occur if a portion or most of them were rendered inactive from any reason.

The use of one of the side plates for the coupling bar simplifies the construction, and aids in making it dust and snow proof, as well as easily accessible.

The operation of the device to take up slack due to wear of the shoes, is well known and therefor I do not describe it.

What I claim as my invention is—

1. The combination with two oppositely moving levers of a car brake apparatus of a slack-take-up connecting bar therefor made in two sections, an open ended sleeve on the end of one section, a notched bar on the end of the other section slidingly engaging in the sleeve, a series of dogs or pawls in the sleeve engaging the notched bar, and a coupler bar for connecting the dogs and insuring them simultaneous and uniform engagement.

2. The combination with two oppositely moving levers of a car brake apparatus, of a slack take up connecting bar therefor made in two sections, an open ended sleeve on the end of one section, a notched bar on the end of the other section slidingly engaging in the sleeve a series of dogs engaging the notched bar, a coupler bar connecting the dogs and acting to cause them to move simultaneously and devices for lifting the bar to disengage the dogs.

3. The combination with two oppositely moving levers of a car brake apparatus of a slack take up connecting bar therefor made in two sections, an open ended sleeve at the end of one bar, a ratchet bar at the end of the other section slidingly engaging into the sleeve, a movable closing plate forming one side only of the box or sleeve, pawls or dogs on the sleeve engaging the ratchet bar, and a connection between the movable plate and pawls whereby the latter are actuated by the plate.

4. In a device of the kind described, the combination of the two part bar having overlapping ends slidingly engaging together, one within the other, a notched face on the inner section a series of dogs on the other section engaging the notches, the plate M vertically slidingly supported and forming one side of the inclosing section, pins on the dogs engaging recesses in the plate, and flanged cam P for lifting said plate, to disengage the dogs.

In testimony whereof I affix my signature in presence of two witnesses.

JAMES H. SEWALL.

Witnesses:
C. R. DUFFETT,
FREDERIC J. LAUGHLIN.